US008370880B2

(12) United States Patent
Ghahramani

(10) Patent No.: US 8,370,880 B2
(45) Date of Patent: Feb. 5, 2013

(54) TELEPHONE CONTROL SERVICE

(75) Inventor: Fred Ghahramani, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 568 days.

(21) Appl. No.: 12/143,788

(22) Filed: Jun. 21, 2008

(65) Prior Publication Data

US 2009/0318173 A1  Dec. 24, 2009

(51) Int. Cl.
*H04N 7/18* (2006.01)
*H04N 7/173* (2011.01)
*H04W 4/00* (2009.01)

(52) U.S. Cl. ............................ 725/81; 725/153; 455/466

(58) Field of Classification Search ................ 725/81, 725/153; 455/466
See application file for complete search history.

(56) References Cited

U.S. PATENT DOCUMENTS

| | | | |
|---|---|---|---|
| 6,193,610 B1 | 2/2001 | Junkin | |
| 6,850,604 B2* | 2/2005 | Cannell et al. | 379/93.01 |
| 7,058,356 B2* | 6/2006 | Slotznick | 455/3.05 |
| 7,580,005 B1* | 8/2009 | Palin | 345/1.1 |
| 2004/0111749 A1* | 6/2004 | Zhang et al. | 725/87 |
| 2005/0028218 A1* | 2/2005 | Blake | 725/113 |
| 2005/0091693 A1 | 4/2005 | Amine et al. | |
| 2006/0184980 A1 | 8/2006 | Cole | |
| 2006/0230415 A1 | 10/2006 | Roeding | |
| 2006/0291506 A1 | 12/2006 | Cain | |
| 2007/0097860 A1 | 5/2007 | Rys et al. | |
| 2007/0107019 A1 | 5/2007 | Romano et al. | |
| 2007/0130592 A1 | 6/2007 | Haeusel | |
| 2007/0243881 A1* | 10/2007 | Roskowski | 455/456.1 |
| 2008/0037864 A1* | 2/2008 | Zhang et al. | 382/156 |
| 2008/0123626 A1* | 5/2008 | Yin | 370/352 |

OTHER PUBLICATIONS

"SES Astra Signs Blucom Contract with Prosiebensat1", retrieved at <<http://www.ses.com/ses/siteSections/mediaroom/archive_inactive/2006_pub/06_11_14_1/index.php>>, p. 1.
Lin, et al., "Controlling digital TV set-top box with mobile devices via an IP network", Proceedings of the Seventh IEEE International Symposium on Multimedia (ISM'05), IEEE Computer Society, IEEE, 2005, pp. 8.

* cited by examiner

*Primary Examiner* — Pankaj Kumar
*Assistant Examiner* — Franklin Andramuno
(74) *Attorney, Agent, or Firm* — Wolfe-SBMC

(57) ABSTRACT

A telephone control service is described. In embodiment(s), a request to interface with a content distributor can be received from a mobile phone, and the content distributor can correlate the mobile phone with a television client device that receives television media content from the content distributor. The content distributor can communicate an instruction to configure a client device feature according to the request from the mobile phone. In other embodiment(s), a request for a video clip can be received from the mobile phone, and the content distributor can obtain and communicate the video clip to be rendered on the mobile phone. In other embodiment(s), a request to interface with the content distributor as a diagnostic aid can be received from the mobile phone. The content distributor can execute diagnostic instructions according to the request to identify system problems, and communicate the system problems to the mobile phone as diagnostic feedback.

9 Claims, 8 Drawing Sheets

TELEPHONE CONTROL SERVICE

BACKGROUND

Viewers have an ever-increasing selection of media content to choose from, such as television programming, movies, videos, and music that is available for selection from a television client device in a viewer's home. From a television client device, a viewer can select a program for viewing, browse a program guide, and select a scheduled program to record for viewing at a time that is convenient for the viewer. As a subscriber to a television content distribution system, a viewer may also be able to access the content distributor from a desktop computer to browse a program guide of scheduled television programming and/or select a scheduled program for recording. While it is convenient to access a television programming schedule from a computer, such as from work to initiate a recording of a program for later viewing when the viewer gets home, a television programming schedule is not always accessible to a viewer. When commuting or driving, for example, it would not be practical or safe to browse a television programming schedule and/or set program recordings from a computer or other similar mobile computing device.

SUMMARY

This summary is provided to introduce simplified concepts of a telephone control service. The simplified concepts are further described below in the Detailed Description. This summary is not intended to identify essential features of the claimed subject matter, nor is it intended for use in determining the scope of the claimed subject matter.

A telephone control service is described. In embodiment(s), a request to interface with a content distributor can be received from a mobile phone, and the content distributor can correlate the mobile phone with a television client device that receives television media content from the content distributor. The content distributor can then communicate an instruction to configure a client device feature according to the request from the mobile phone. In other embodiment(s), a request for a video clip can be received from the mobile phone, and the content distributor can then obtain and communicate the video clip to be rendered on the mobile phone. In other embodiment(s), a request to interface with the content distributor as a diagnostic aid can be received from the mobile phone. The content distributor can then execute diagnostic instructions to identify possible system problems, and communicate any identified system problems to the mobile phone as diagnostic feedback.

In other embodiment(s), any of the requests from a mobile phone can be received as a telephone call, or received as a text message. A telephone call from a mobile phone can include menu selections, such as keypad inputs and/or voice-prompted inputs, to interface with the content distributor for television client device configuration, to request a video clip, and/or to interface with the content distributor as a diagnostic aid. A text message received from a mobile phone can be parsed to determine the requested client device configuration, video clip, or requested diagnostics.

BRIEF DESCRIPTION OF THE DRAWINGS

Embodiments of a telephone control service are described with reference to the following drawings. The same numbers are used throughout the drawings to reference like features and components.

DETAILED DESCRIPTION

Embodiments of a telephone control service provide that a subscriber to a media content distribution system can access a television client device from any location with a mobile phone, and not just from home or via a computer. For example, a user can initiate a request from a mobile phone to initiate a configuration setting or update to a television client device. A content distributor can receive a request from a mobile phone when initiated by a user, correlate the mobile phone with a television client device that is also associated with the user, and then communicate an instruction to initiate a configuration setting or update at the television client device. A request for a video clip can also be received from a mobile phone when initiated by a user, and the content distributor can obtain and communicate the video clip to be rendered on the mobile phone. A request to forward a video clip to another mobile phone can also be received when initiated by a user at a mobile phone, and the content distributor can forward or otherwise communicate the video clip to the other mobile phone via a wireless communications network.

A request to interface with the content distributor as a diagnostic aid can also be received from the mobile phone. A user can utilize the mobile phone for a dialog-based approach to troubleshooting possible problems with the content distribution system via two-way communications. The content distributor can then execute diagnostic instructions to identify possible system problems, and communicate the system problems to the mobile phone as diagnostic feedback.

While features and concepts of the described systems and methods for a telephone control service can be implemented in any number of different environments, systems, and/or various configurations, embodiments of a telephone control service are described in the context of the following example systems and environments.

Figure 1:
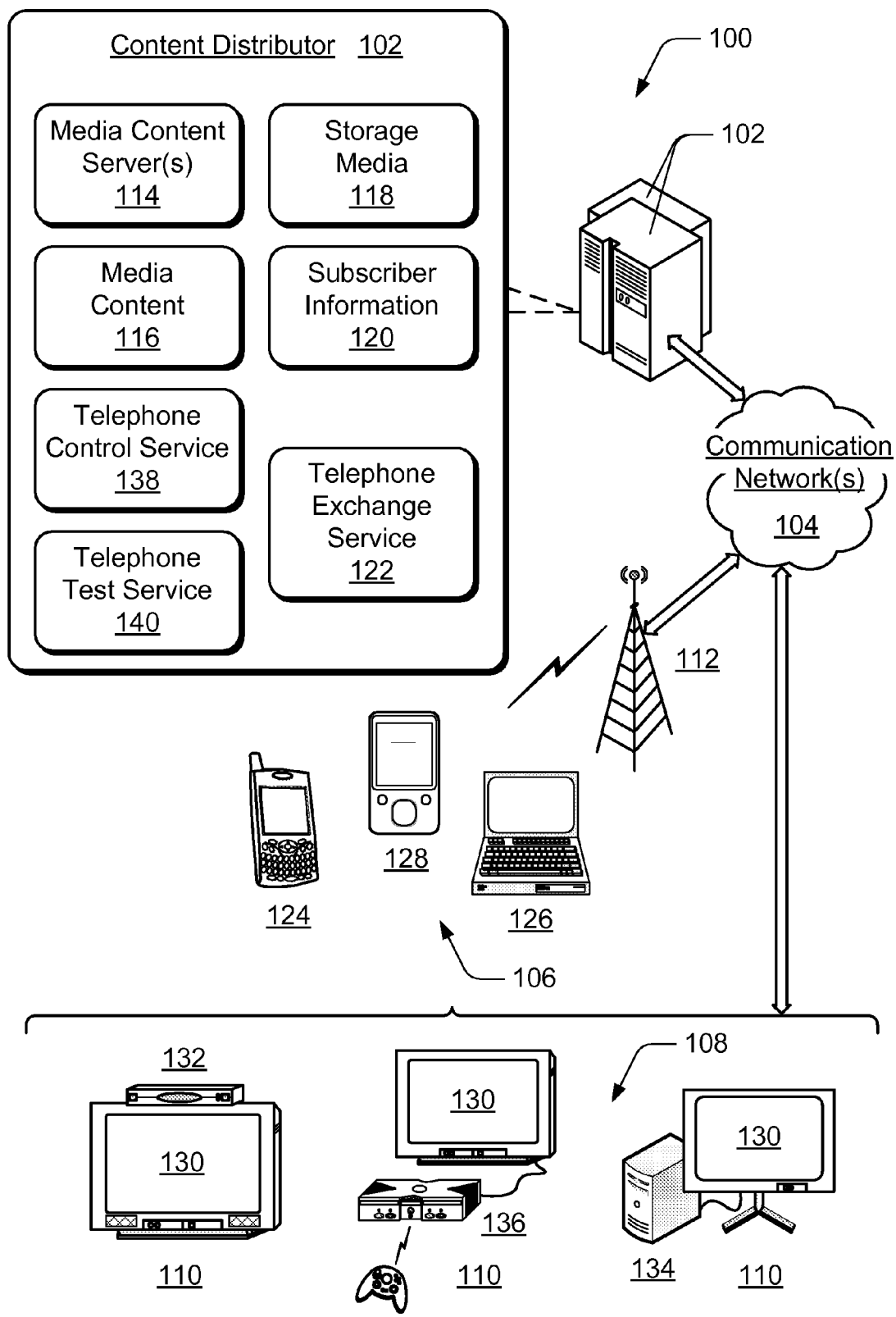
FIG. 1 illustrates an example system in which embodiments of a telephone control service can be implemented.

FIG. 1 illustrates an example system 100 in which various embodiments of a telephone control service can be implemented. In this example, system 100 includes one or more content distributors 102 that communicate or otherwise provide media content to any number of various media devices via communication network(s) 104. The various media devices can include wireless media devices 106 as well as other media devices 108 (e.g., wired and/or wireless client devices) that are implemented as components in various client systems 110. In a media content distribution system, the content distributors 102 facilitate the distribution of media content, content metadata, and/or other associated data to multiple viewers, users, customers, viewing systems, and devices.

The communication network(s) 104 can be implemented to include any type of data network, voice network, broadcast network, an IP-based network, a wide area network (e.g., the Internet), and/or a wireless communications network 112 that facilitates media content distribution, as well as data and/or voice communications between the content distributors 102 and any number of the various media devices. The communication network(s) 104 can also be implemented using any type of network topology and/or communication protocol, and can be represented or otherwise implemented as a combination of two or more networks. Any one or more of the arrowed communication links facilitate two-way communications, such as from the content distributor 102 to a media device 108 (e.g., a client device) and vice-versa.

The content distributor 102 can include media content servers 114 that are implemented to receive television media content for distribution to subscriber media devices. The content distributor 102 can receive television media content 116 from various content sources, such as a content provider, an advertiser, a national television distributor, and the like. The content distributor 102 can communicate or otherwise distribute media content 116 and/or other data to any number of the various wireless media devices 106 and other media devices 108.

The media content 116 (e.g., to include recorded media content) can include any type of audio, video, and/or image media content received from any type of media content source. As described throughout, "media content" can include television programs (or programming), advertisements, commercials, music, movies, video clips, and on-demand media content. Other media content can include interactive games, network-based applications, and any other audio, video, and/or image content (e.g., to include program guide application data, user interface data, advertising content, closed captions data, content metadata, search results and/or recommendations, and the like).

In the example system 100, the content distributor 102 includes storage media 118 to store or otherwise maintain various data and media content, such as media content 116, media content metadata, and subscriber information 120. In a Network Digital Video Recording (nDVR) implementation, recorded on-demand assets can be recorded when initially distributed to the various media devices as scheduled television media content, and stored with the storage media 118 or other suitable storage device. The storage media 118 can be implemented as any type of memory, random access memory (RAM), read only memory (ROM), any type of magnetic or optical disk storage, and/or other suitable electronic data storage.

In this example, content distributor 102 includes a telephone exchange service 122 that can be implemented to receive telephone communications, such as telephone calls and/or text messages from a mobile phone. In addition, a content distributor 102 can be implemented with any number and combination of differing components as further described with reference to the example device shown in FIG. 9. Although illustrated and described as a component or module of the content distributor 102, the telephone exchange service 122, as well as other functionality to implement the various embodiments described herein, can also be provided as a service apart from the content distributor 102 (e.g., on a separate server or by a third party service).

The wireless media devices 106 can include any type of device implemented to receive and/or communicate wireless data and voice communications, such as any one or combination of a mobile phone 124 (e.g., cellular, VoIP, WiFi, etc.), a portable computer device 126, a media device 128 (e.g., a personal media player, portable media player, etc.), and/or any other wireless media device that can receive media content in any form of audio, video, and/or image data. Each of the client systems 110 include a respective client device and display device 130 that together render or playback any form of audio, video, and/or image content, media content, and/or television content.

A display device 130 can be implemented as any type of a television, high definition television (HDTV), LCD, or similar display system. A client device in a client system 110 can be implemented as any one or combination of a television client device 132 (e.g., a television set-top box, a digital video recorder (DVR), etc.), a computer device 134, a gaming system 136, an appliance device, an electronic device, and/or as any other type of client device that can be implemented to receive television content or media content in any form of audio, video, and/or image data in a media content distribution system.

Any of the wireless media devices 106 and/or other media devices 108 can be implemented with one or more processors, communication components, memory components, signal processing and control circuits, and a media content rendering system. A media device may also be associated with a user or viewer (i.e., a person) and/or an entity that operates the device such that a media or client device describes logical devices that include users, software, and/or a combination of devices.

In this example, the content distributor 102 includes a telephone control service 138 and a telephone test service 140 that can each be implemented as computer-executable instructions and executed by processor(s) to implement various embodiments as described herein. Although illustrated and described as a component or module of the content distributor 102, the telephone control service 138 and the telephone test service 140, as well as other functionality to implement the various embodiments described herein, can also be provided as a service apart from the content distributor 102 (e.g., on a separate server or by a third party service).

In one or more embodiments, a user of mobile phone 124 can initiate a request for a video clip (e.g., media content 116). The telephone exchange service 122 can receive the request for the video clip as a telephone call initiated from the mobile phone, or as a text message initiated from the mobile phone. In an embodiment, a telephone call to request the video clip can include various menu selections, such as keypad inputs and/or voice-prompted inputs, that identify the requested video clip.

The telephone exchange service 122 can interface with the telephone control service 138 that can be implemented to obtain the video clip, such as from storage media 118, or from a content provider or any other type of local or remote storage media that is networked via the communication network(s) 104. In an embodiment, the telephone control service 138 can also receive and parse a text message to determine the requested video clip when the request is received as a formatted text message.

In an embodiment, the telephone control service 138 can also determine that the mobile phone 124 is registered to a user that has a corresponding television client device 132 as a customer of the media content distribution system. For example, the content distributor 102 can include a feature for authentication to verify that a particular mobile phone is associated with a customer account. The subscriber information 120 can include a unique identifier that is established for a particular user, mobile phone, and/or client device where the unique identifier is some combination of a user identifier, a client device identifier, a mobile phone identifier, a phone number, and any other identifier that can be utilized for customer registration and/or authentication.

When the telephone control service 138 obtains the requested video clip, such as from media content 116, the telephone exchange service 122 can initiate communication of the video clip to the mobile phone 124 via wireless communications network 112. In an event that a request for a video clip is received as a text message, the telephone exchange service 122 can initiate a telephone call to the mobile phone 124 to establish a communication link (e.g., wired and/or wireless) by which the video clip is communicated to the mobile phone.

In another embodiment, a user of mobile phone 124 can initiate a request to forward a video clip to another mobile phone that is connected via the telephone exchange service 122 and/or is a subscriber to the media content distribution system. The telephone exchange service 122 can receive the request to forward the video clip as a telephone call initiated from the mobile phone 124, or as a text message initiated from the mobile phone. The telephone exchange service 122 can then communicate or otherwise forward the video clip to the additional mobile phone via the wireless communications network 112 to be rendered on the additional mobile phone.

In other embodiments, a user of mobile phone 124 can initiate a request to interface with content distributor 102 to configure a setting, or update a configuration setting, of a television client device 132. A user of the mobile phone 124 can access the television client device 132 from any location via the mobile phone, and not just from home or via a computer. The telephone exchange service 122 can receive the request as a telephone call initiated from the mobile phone 124, or as a text message initiated from the mobile phone. In an embodiment, a telephone call to interface with the content distributor can include various menu selections, such as keypad inputs and/or voice-prompted inputs.

The telephone exchange service 122 can interface with the telephone control service 138 that correlates the mobile phone 124 with the television client device 132 that receives media content 116 from the content distributor 102. For example, the telephone control service 138 can correlate the mobile phone 124 with the television client device 132 by the subscriber information 120. When the television client device 132 that is associated with the mobile phone 124 is determined, the telephone exchange service 122 can communicate an instruction to the television client device to configure a client device feature according to the request from the mobile phone. For example, the telephone exchange service 122 can communicate an instruction that initiates the television client device to schedule a program recording, initiates the television client device to configure a parental control setting or other security setting, and/or initiates the television client device to update any type of configuration setting of the device.

In other embodiments, a user of mobile phone 124 can initiate a request to interface with content distributor 102 as a diagnostic aid. The telephone exchange service 122 can receive the request as a telephone call initiated from the mobile phone 124, or as a text message initiated from the mobile phone. In an embodiment, a telephone call can include various menu selections, such as keypad inputs and/or voice-prompted inputs. As a diagnostic aid, a user or service provider can utilize the mobile phone 124 for a dialog-based approach to troubleshooting possible problems with the content distribution system via two-way communications.

The telephone exchange service 122 can interface with the telephone test service 140 that can be implemented to initiate executing diagnostic instructions according to the request from the mobile phone to identify possible system problems associated with the content distributor. Scripted diagnostic scenarios can be executed to status components and server capacities of the content distributor 102, and to troubleshoot possible problems like poor signal or audio quality, slow network traffic, and the like. The telephone exchange service 122 can initiate communication of determined system problems to the mobile phone 124 via the wireless communications network 112 to render the system problems as a telephone communication of diagnostic feedback.

The telephone test service 140 can also initiate executing diagnostic instructions according to the request from the mobile phone to determine test metrics and statistics associated with the content distributor 102 and/or media content distribution. The diagnostic instructions can be provided as tools to the content distributor for effective statistic determinations and notification of data that pertains to system operations. The telephone exchange service 122 can also initiate communication of the test metrics and statistics to the mobile phone 124 via the wireless communications network 112 to render the test metrics and statistics as a telephone communication of diagnostic feedback.

Figure 2:
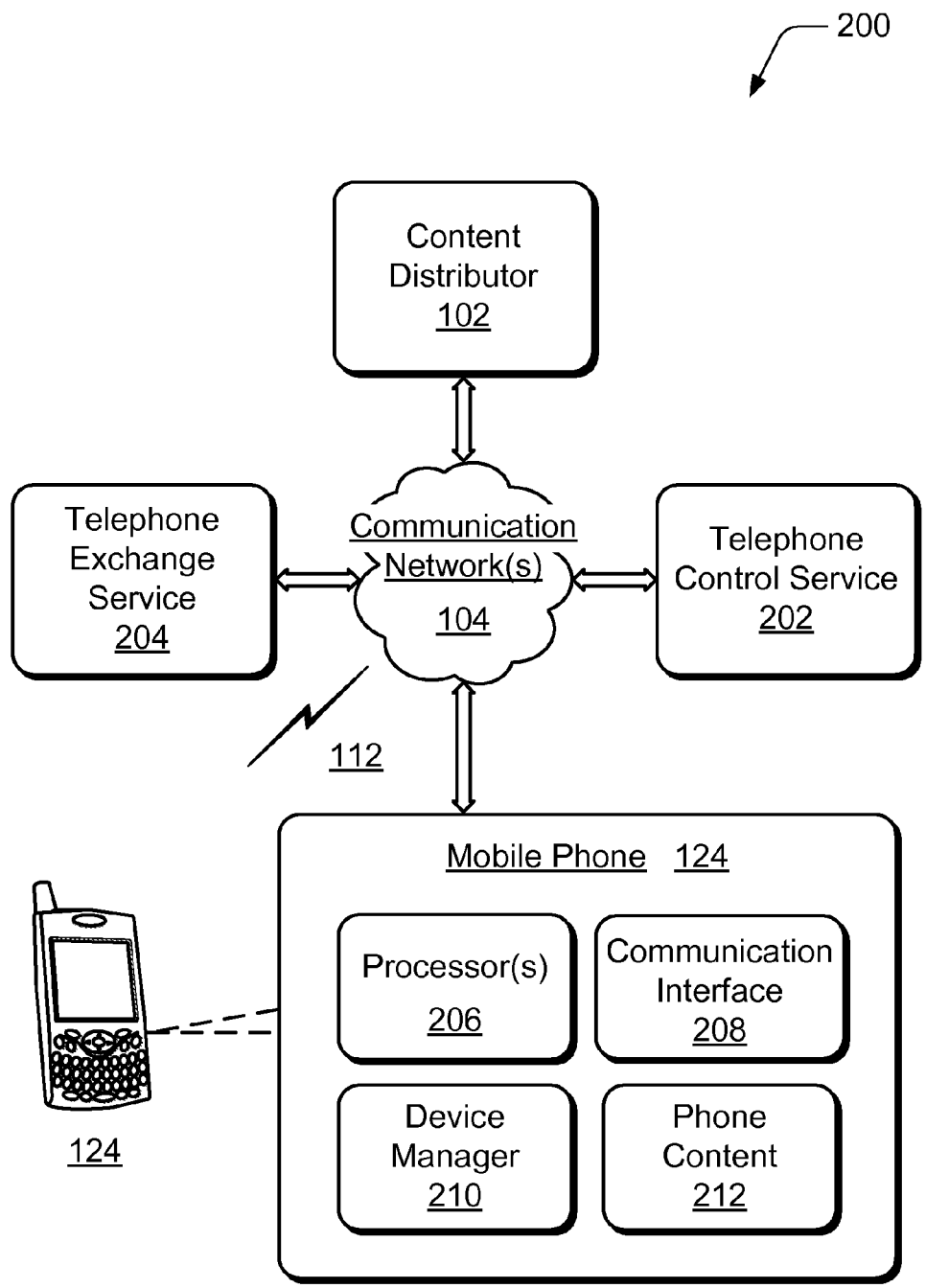
FIG. 2 illustrates another example system in which embodiments of telephone control service can be implemented.

FIG. 2 illustrates an example system 200 in which various embodiments of a telephone control service can be implemented. In this example, system 200 includes the content distributor 102 and mobile phone 124 as described with reference to FIG. 1. System 200 also includes an example of a telephone control service 202 and a telephone exchange service 204. The content distributor 102, telephone control service 202, telephone exchange service 204, and mobile phones (e.g., mobile phone 124) can all be implemented for communication with each other via the communication network(s) 104 and/or the wireless communications network 112.

In this example, the telephone control service 202 and the telephone exchange service 204 are each implemented as independent components of system 200, and can each implement the functions described with reference to FIG. 1. In addition, the telephone exchange service 204 can provide for mobile data and/or voice communications. For example, the telephone exchange service 204 may be implemented as a communication service provider, a cell-phone provider, an Internet service provider, and/or a combination thereof. The telephone exchange service 204 enables data and/or voice communications for any type of a mobile device or mobile phone 124 (e.g., cellular, VoIP, WiFi, etc.), and/or any other wireless media or communication device that can receive data, voice, or media content in any form of audio, video, and/or image data.

In an embodiment, the telephone control service 202 can be implemented as a subscription-based service. The telephone control service 202 can also be implemented as an independent or third-party service to implement the various embodiments described herein. Alternatively, the telephone control service 202 can be implemented as a component or service of the content distributor 102, and optionally, made available as a service or feature of a cell phone connection plan.

The mobile phone 124 can be implemented with processing, communication, and memory components, as well as signal processing and control circuits. The mobile phone 124 may also be associated with a user or owner (i.e., a person) and/or an entity that operates the device such that a mobile phone describes logical devices that include users, software, and/or a combination of devices. In this example, the mobile phone 124 includes one or more processors 206 (e.g., any of microprocessors, controllers, and the like), a communication interface 208 to receive and/or communicate data and voice communications, and a device manager 210 (e.g., a control application, software application, signal processing and control module, etc.).

The mobile phone 124 also includes phone content 212, such as configuration settings of the mobile phone, media content received and/or stored on the mobile phone, information associated with a user of the mobile phone (e.g., user profile data and/or registration data that can be communicated to the content distributor 102), and/or messaging content that has been received and/or communicated via the mobile phone. The device manager 210 can include communication logic to communicate registration and/or authentication information (e.g., phone content 212) to indicate that the mobile phone 124 is registered to a user that has a corresponding television client device as a customer of a media content distribution system.

Example methods 300 through 700 are described with reference to respective FIGS. 3-7 in accordance with one or more embodiments of a telephone control service. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example methods 300 through 700 may be described in the general context of computer-executable instructions. Generally, computer-executable instructions can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
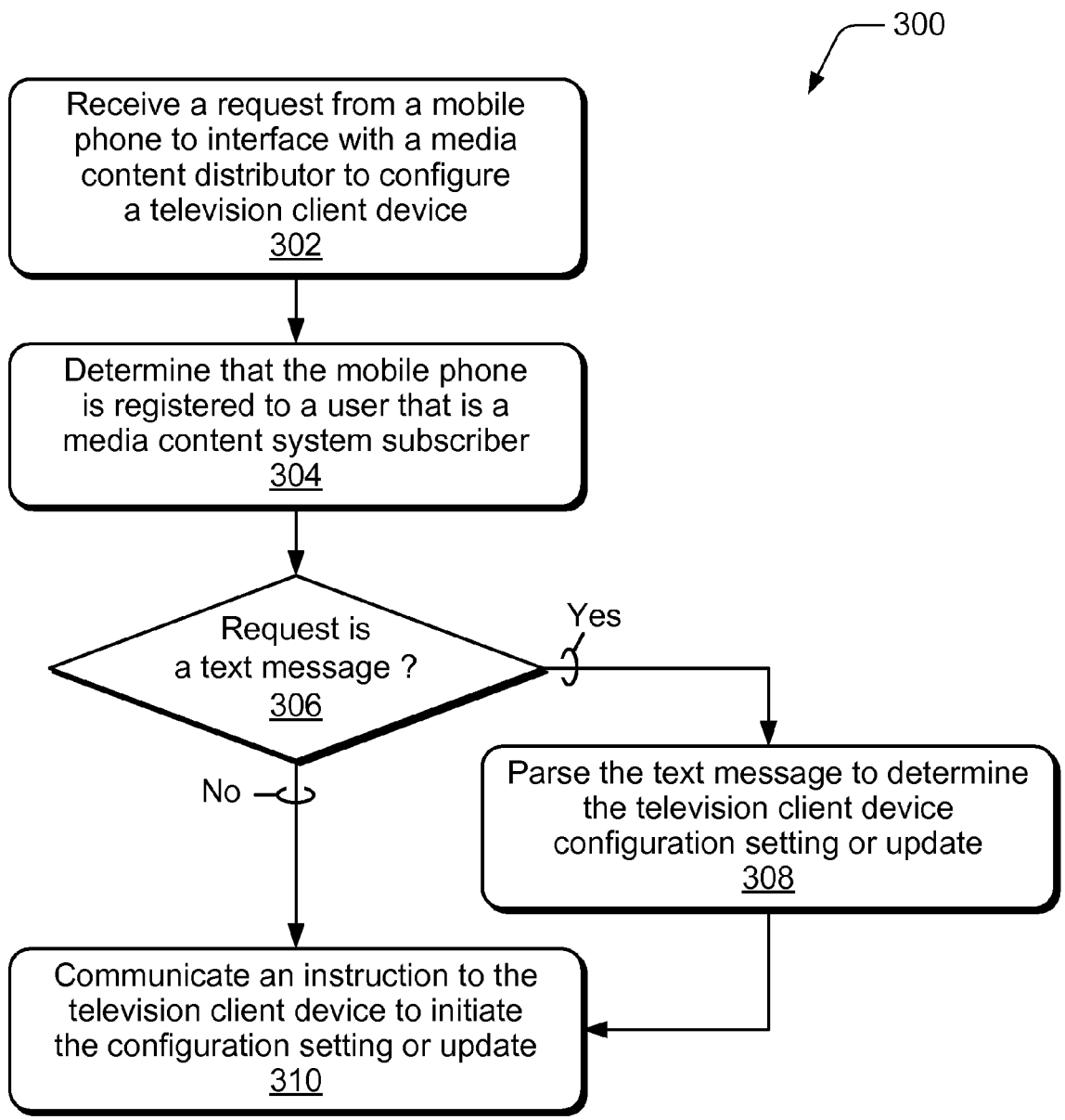
FIGS. 3-7 illustrate example method(s) for a telephone control service in accordance with one or more embodiments.

FIG. 3 illustrates example method(s) 300 of a telephone control service. The order in which the method is described is not intended to be construed as a limitation, and any number of the described method blocks can be combined in any order to implement the method, or an alternate method.

At block 302, a request to interface with a media content distributor is received from a mobile phone to configure a television client device. For example, telephone exchange service 122 at content distributor 102 (FIG. 1) receives a request to interface with the content distributor as a telephone call or text message that is initiated from mobile phone 124. The telephone call can include menu selections, such as keypad inputs or voice-prompted inputs, to select a configuration setting or update for a television client device.

At block 304, the mobile phone is determined to be registered to a user that is a media content system subscriber. For example, the telephone control service 138 at content distributor 102 correlates or otherwise determines that the mobile phone 124 is registered to a user that has a corresponding television client device 132 as a customer of the media content distribution system.

At block 306, a determination is made as to whether the request is received as a text message. If the request is received as a text message (i.e., "yes" from block 306), then at block 308, the text message is parsed to determine the configuration setting or update that is being requested for the television client device. For example, the telephone control service 138 parses the text message to determine the configuration setting or update when the request is received as a formatted text message.

If the request is received as a telephone call (i.e., "no" from block 306), or continuing from block 308, an instruction is communicated to a television client device to initiate configuring or updating a client device feature according to the request from the mobile phone at block 310. For example, the telephone exchange service 122 communicates an instruction to television client device 132, such as an instruction that initiates the television client device to schedule a program recording, configure a parental control setting or other security setting, update a configuration setting of a client device feature, and/or any other type of configuration setting or update.

Figure 4:
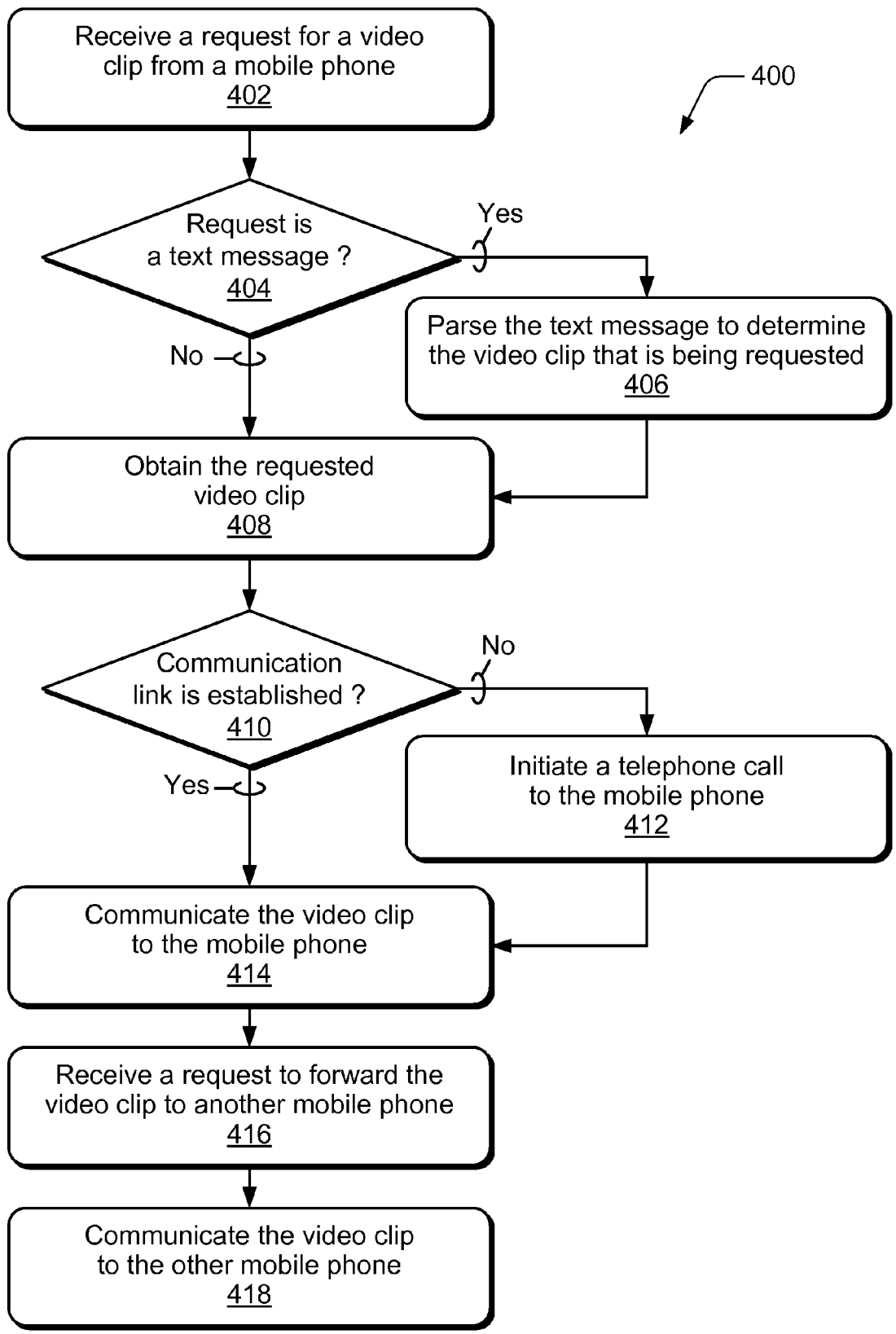

FIG. 4 illustrates example method(s) 400 of a telephone control service. The order in which the method is described is not intended to be construed as a limitation, and any number of the described method blocks can be combined in any order to implement the method, or an alternate method.

At block 402, a request for a video clip is received from a mobile phone that is associated with a content distributor. For example, telephone exchange service 122 at content distributor 102 (FIG. 1) receives a request for a video clip (e.g., media content 116) as a telephone call initiated from mobile phone 124. The telephone call can include menu selections, such as keypad inputs or voice-prompted inputs, to identify the video clip that is being requested. In another example, the telephone exchange service 122 receives a request for a video clip as a text message that is initiated from the mobile phone 124.

At block 404, a determination is made as to whether the request for the video clip is received as a text message. If the request for the video clip is received as a text message (i.e., "yes" from block 404), then at block 406, the text message is parsed to determine the video clip that is being requested. For example, the telephone control service 138 parses the text message to determine the requested video clip when the request is received as a formatted text message. If the request for the video clip is received as a telephone call (i.e., "no" from block 404), or continuing from block 406, the requested video clip is obtained at block 408. For example, the telephone control service 138 can obtain the video clip, such as from storage media 118, or from a content provider or any other networked storage media or device.

At block 410, a determination is made as to whether a communication link is established with the mobile phone. For example, if a request for a video clip is received as a telephone call initiated from mobile phone 124, then a communication link (e.g., a telephone call) is already established between the telephone exchange service 122 and mobile phone 124. However, if a request for a video clip is received as a text message, then a communication link likely has not been maintained (e.g., other than to receive the text message).

If a communication link with the mobile phone is not established (i.e., "no" from block 410), then at block 412, a telephone call is initiated to the mobile phone. For example, the telephone exchange service 122 initiates a communication link (e.g., a telephone call) to the mobile phone 124. If a communication link with the mobile phone is established (i.e., "yes" from block 410), or continuing from block 412, the video clip is communicated to the mobile phone to be rendered on the mobile phone at block 414. For example, the telephone exchange service 122 communicates the video clip to the mobile phone 124 via the wireless communications network 112 to be rendered on the mobile phone.

At block 416, a request to forward the video clip to another mobile phone is received. For example, telephone exchange service 122 receives a request from the mobile phone 124 to forward the video clip to another mobile phone when initiated as a telephone call, or as a text message initiated from the mobile phone 124. The telephone exchange service 122 can then communicate or otherwise forward the video clip to the additional mobile phone via the wireless communications network 112 to be rendered on the additional mobile phone.

At block 418, the video clip is communicated or otherwise forwarded to the other mobile phone to be rendered on the mobile phone. For example, the telephone exchange service 122 communicates the video clip to the other mobile phone via the wireless communications network 112 to be rendered on the mobile phone.

Figure 5:
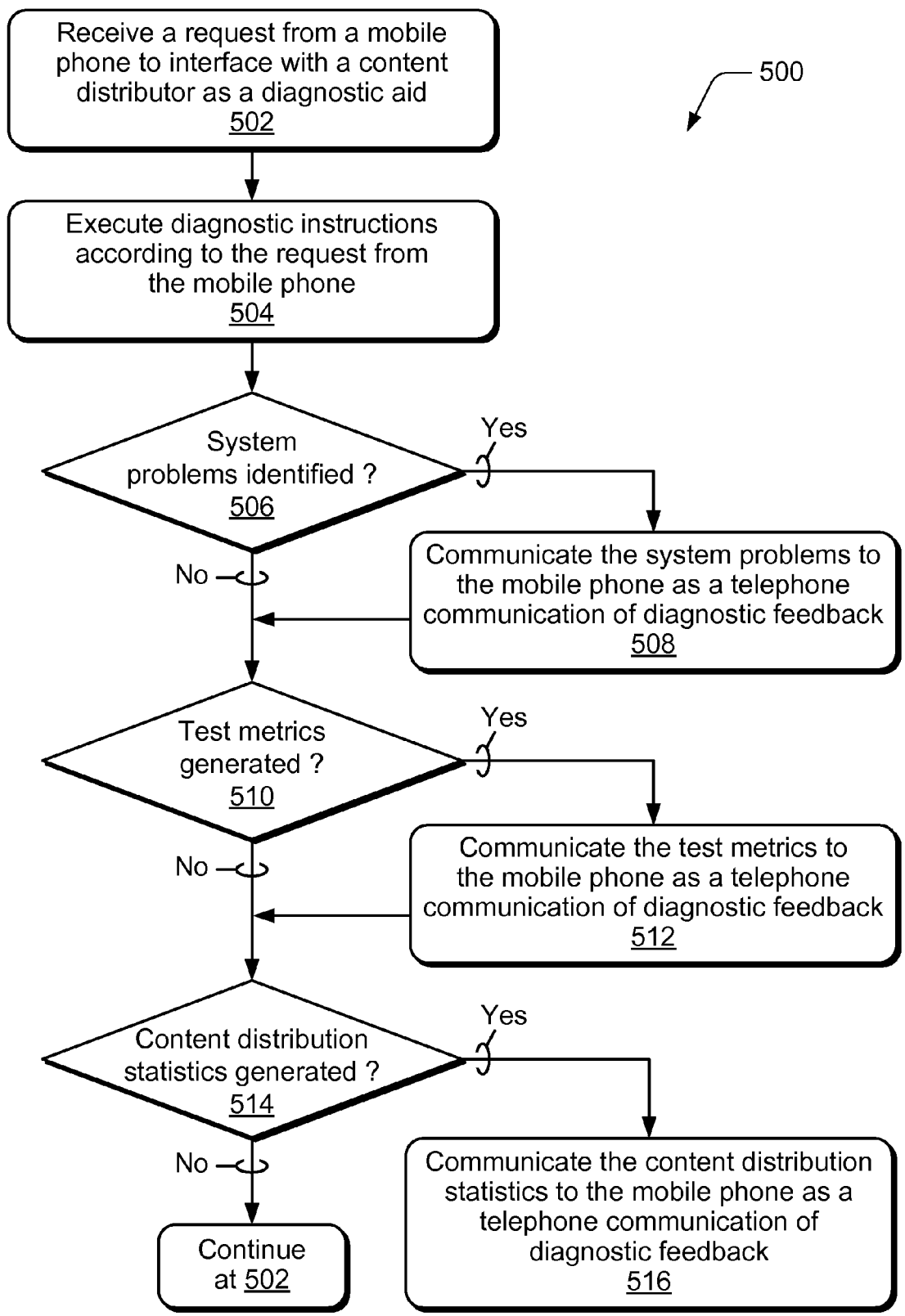

FIG. 5 illustrates example method(s) 500 of a telephone control service. The order in which the method is described is not intended to be construed as a limitation, and any number of the described method blocks can be combined in any order to implement the method, or an alternate method.

At block 502, a request is received from a mobile phone to interface with a content distributor as a diagnostic aid. For example, the telephone exchange service 122 at content distributor 102 receives a request as a telephone call or text message initiated from the mobile phone 124. As a diagnostic aid, a user or service provider can utilize the mobile phone 124 for a dialog-based approach to troubleshooting possible problems with the content distribution system via two-way communications.

At block 504, diagnostic instructions are executed according to the request from the mobile phone. For example, the telephone test service 140 at content distributor 102 initiates execution of diagnostic instructions to identify possible system problems associated with the content distributor, to determine test metrics associated with the content distributor, and/or to determine content distribution statistics associated with the content distributor. Scripted diagnostic scenarios can be executed to status components and server capacities of the content distributor 102, and to troubleshoot possible problems like poor signal or audio quality, slow network traffic, and the like. The diagnostic instructions are also executed as tools at the content distributor 102 for statistic determinations and notification of data that pertains to system operations.

At block 506, a determination is made as to whether system problems associated with the content distributor are identified. If system problems associated with the content distributor are identified (i.e., "yes" from block 506), then at block 508, the system problems are communicated to the mobile phone as a telephone communication of diagnostic feedback. For example, the telephone exchange service 122 initiates communication of determined system problems to mobile phone 124 via the wireless communications network 112 to render the system problems as a telephone communication of diagnostic feedback.

At block 510 (i.e., "no" from block 506, or continuing from block 508), a determination is made as to whether test metrics are generated when executing the diagnostic instructions. If test metrics associated with the content distributor are generated (i.e., "yes" from block 510), then at block 512, the test metrics are communicated to the mobile phone as a telephone communication of diagnostic feedback. For example, the telephone exchange service 122 initiates communication of the test metrics to mobile phone 124 via the wireless communications network 112 to render the test metrics as a telephone communication of diagnostic feedback.

At block 514 (i.e., "no" from block 510, or continuing from block 512), a determination is made as to whether content distribution statistics are generated when executing the diagnostic instructions. If content distribution statistics associated with the content distributor are generated (i.e., "yes" from block 514), then at block 516, the content distribution statistics are communicated to the mobile phone as a telephone communication of diagnostic feedback. For example, the telephone exchange service 122 initiates communication of the content distribution statistics to mobile phone 124 via the wireless communications network 112 to render the content distribution statistics as a telephone communication of diagnostic feedback.

Figure 6:
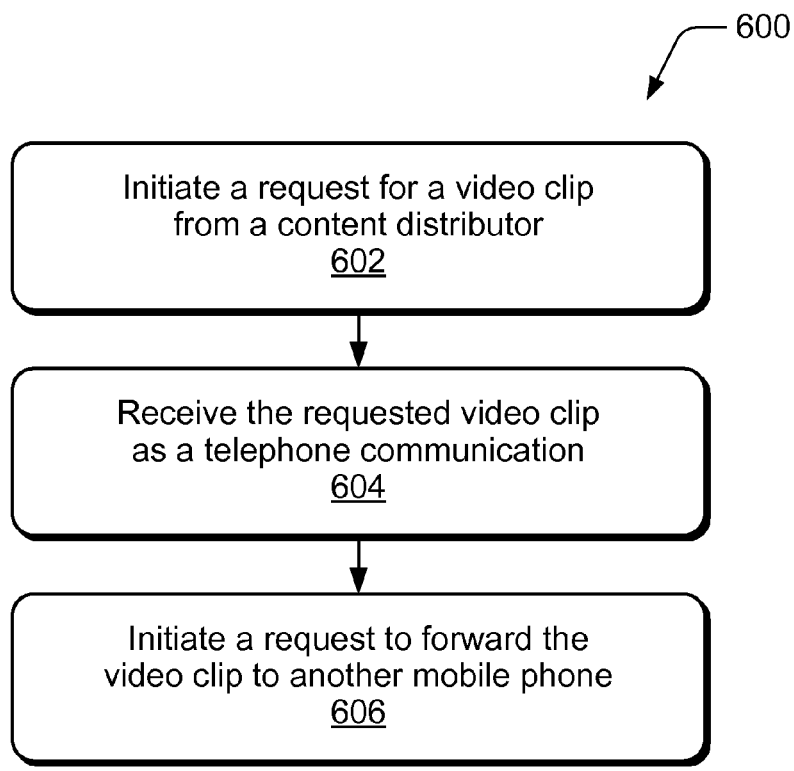

FIG. 6 illustrates example method(s) 600 of a telephone control service, and is described with reference to a mobile phone. The order in which the method is described is not intended to be construed as a limitation, and any number of the described method blocks can be combined in any order to implement the method, or an alternate method.

At block 602, a request for a video clip is initiated. For example, mobile phone 124 (FIG. 1) initiates a request for a video clip (e.g., media content 116) as a telephone call or as a text message. The telephone call can include menu selections, such as keypad inputs or voice-prompted inputs, to identify the video clip that is being requested. The mobile phone 124 can initiate the request for the video clip with the telephone exchange service 122 at content distributor 102.

At block 604, the requested video clip is received as a telephone communication. For example, mobile phone 124 receives the video clip as a telephone communication from the content distributor 102 via the wireless communications network 112. At block 606, a request to forward the video clip to another mobile phone is initiated. For example, mobile phone 124 initiates a request to the telephone exchange service 122 to forward the video clip to another mobile phone. The request can be initiated as a phone call or as a text message from the mobile phone 124. The telephone exchange service 122 then communicates or otherwise forwards the video clip to the additional mobile phone via the wireless communications network 112 to be rendered on the additional mobile phone.

Figure 7:
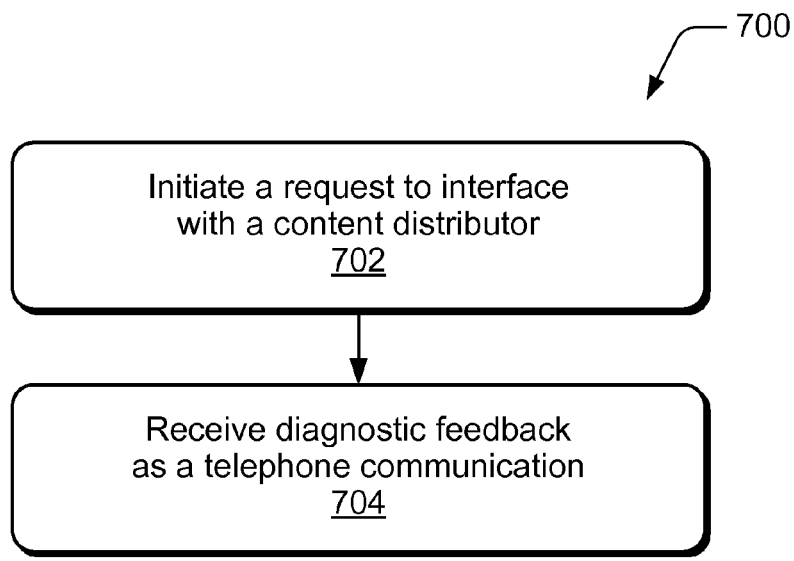

FIG. 7 illustrates example method(s) 700 of a telephone control service, and is described with reference to a mobile phone. The order in which the method is described is not intended to be construed as a limitation, and any number of the described method blocks can be combined in any order to implement the method, or an alternate method.

At block 702, a request to interface with a content distributor is initiated. For example, mobile phone 124 (FIG. 1) initiates a request to interface with content distributor 102 to configure a television client device. The telephone exchange service 122 at content distributor 102 receives a request to interface with the content distributor as a telephone call or text message that is initiated from mobile phone 124. The telephone call can include menu selections, such as keypad inputs or voice-prompted inputs, to select a configuration setting or update for a television client device. In another example, mobile phone 124 initiates a request to interface with content distributor 102 as a diagnostic aid. The telephone exchange service 122 at content distributor 102 receives the request as a telephone call or text message initiated from the mobile phone 124 to function as a diagnostic aid for a dialog-based approach to troubleshooting possible problems with the content distribution system via two-way communications.

Diagnostic instructions can be executed by the telephone test service 140 at content distributor 102 to identify possible system problems associated with the content distributor, to determine test metrics associated with the content distributor, and/or to determine content distribution statistics associated with the content distributor. At block 704, diagnostic feedback is received as a telephone communication. For example, mobile phone 124 receives determined system problems via the wireless communications network 112 to render the system problems as a telephone communication of diagnostic feedback. The mobile phone 124 also receives test metrics via the wireless communications network 112 to render the test metrics as a telephone communication of diagnostic feedback. The mobile phone 124 also receives content distribution statistics via the wireless communications network 112 to render the content distribution statistics as a telephone communication of diagnostic feedback.

Figure 8:
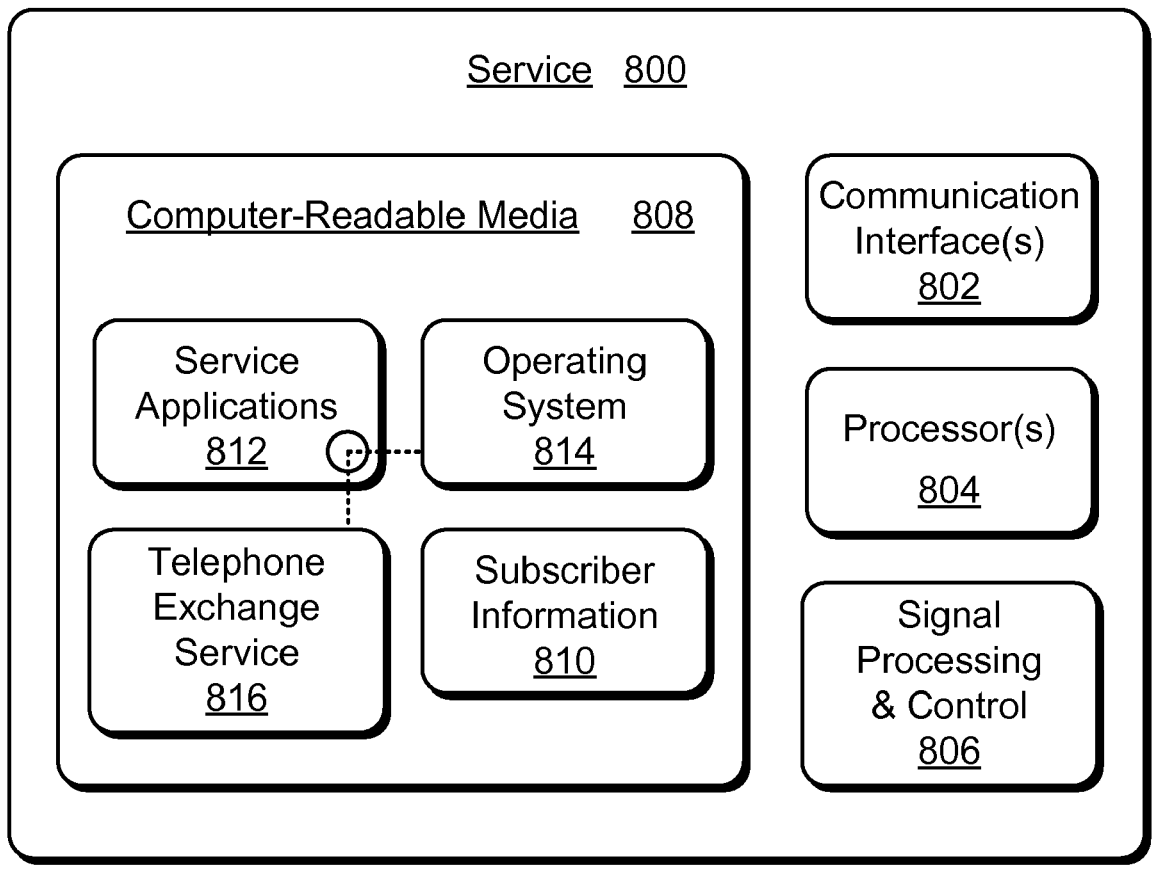
FIG. 8 illustrates various components of an example service that can implement embodiments of a telephone control service.

FIG. 8 illustrates various components of an example service 800 that can implemented as telephone control service 138, telephone test service 140, and/or as telephone control service 202 as shown in respective FIGS. 1-2. Service 800 can include one or more communication interfaces 802 that can be implemented as any one or more of a serial and/or parallel interface, a wireless interface, any type of network interface, a modem, and as any other type of communication interface for data and/or voice communication. The communication interfaces 802 provide a connection and/or communication links between service 800 and communication network(s) by which other communication, electronic, and computing devices can communicate with service 800.

Service 800 can include one or more processors 804 (e.g., any of microprocessors, controllers, and the like) which process various computer-executable instructions to control the operation of service 800 and to implement the various embodiments described herein. Alternatively or in addition, service 800 can be implemented with any one or combination of hardware, firmware, or fixed logic circuitry that is implemented in connection with signal processing and control circuits generally identified at 806.

Service 800 can also include computer-readable media 808, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 808 provides data storage mechanisms to store various types of information and/or data related to operational aspects of service 800, such as subscriber information 810, and provides storage for various service applications 812. For example, an operating system 814 can be maintained as a computer application with the computer-readable media 808 and executed on the processors 804. The service applications 812 can also include a telephone exchange service 816. In this example, the service applications 812 are shown as software modules and/or computer applications that can implement various embodiments of telephone control service.

Although not shown, service 800 can include a system bus or data transfer system that couples the various components within the service. A system bus can include any one or combination of different bus structures, such as a memory bus or memory controller, a peripheral bus, a universal serial bus, and/or a processor or local bus that utilizes any of a variety of bus architectures.

Figure 9:
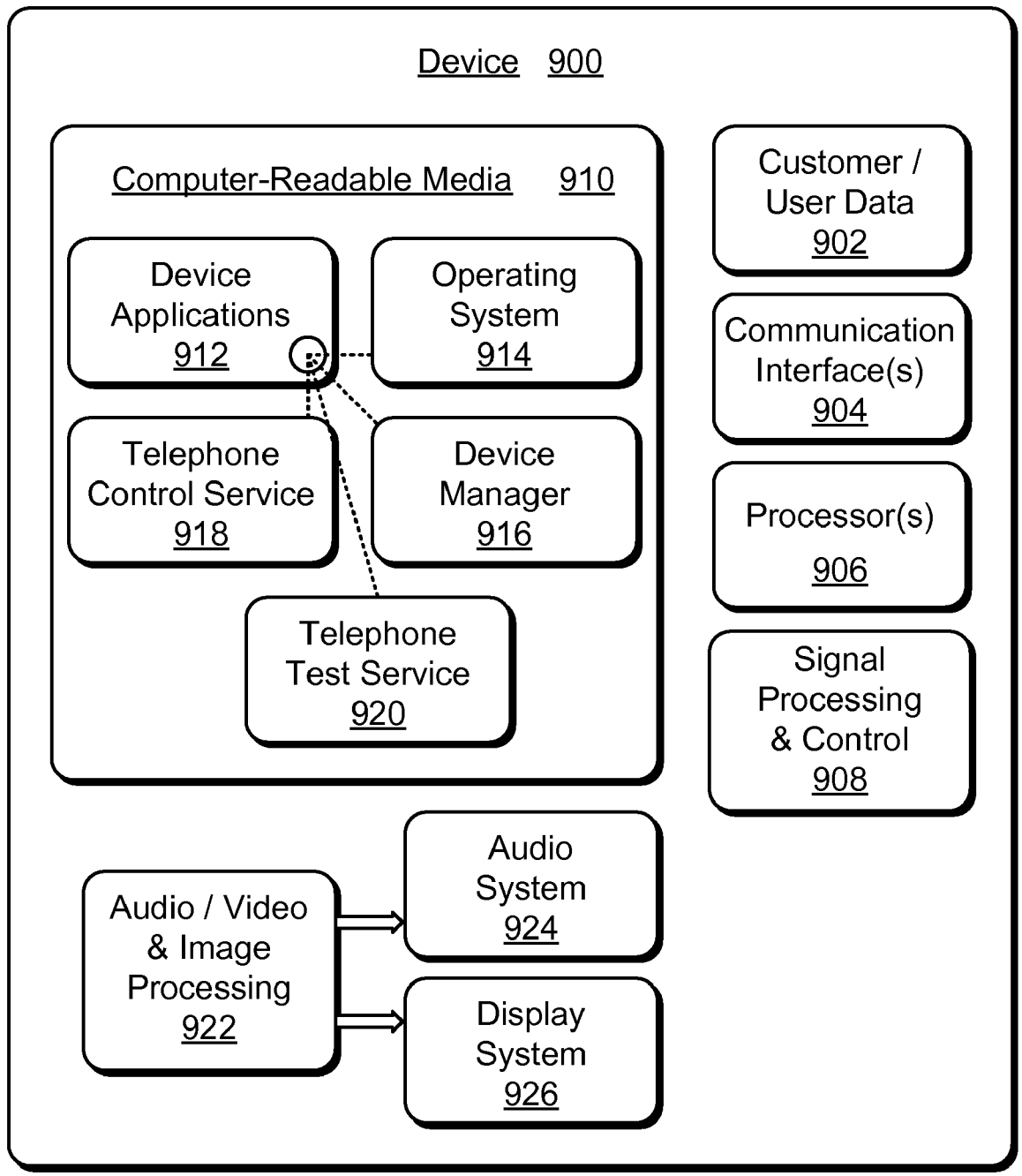
FIG. 9 illustrates various components of an example device that can implement embodiments of a telephone control service.

FIG. 9 illustrates various components of an example device 900 that can be implemented as any form of a mobile communication, computing, electronic, and/or media device to implement various embodiments of a telephone control service. For example, device 900 can be implemented as a mobile phone, computer device, television client device, or content distributor as shown in FIG. 1 and/or FIG. 2. In various embodiments, device 900 can be implemented as any one or combination of a wireless or mobile phone, a portable computer device, and/or as any other type of mobile device that may be implemented for data and/or voice communication.

Device 900 can include customer and/or user data 902, such as information associated with an owner and user of the device, or subscriber registration information. Device 900 further includes one or more communication interfaces 904 that can be implemented for any type of data and/or voice communication via communication network(s).

Device 900 can include one or more processors 906 (e.g., any of microprocessors, controllers, and the like) which process various computer-executable instructions to control the operation of device 900 and to implement embodiments of telephone control service. Alternatively or in addition, device 900 can be implemented with any one or combination of hardware, firmware, or fixed logic circuitry that is implemented in connection with signal processing and control circuits which are generally identified at 908.

Device 900 can also include computer-readable media 910, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 910 provides data storage mechanisms to store the customer and/or user data 902, as well as various device applications 912 and any other types of information and/or data related to operational aspects of device 900. For example, an operating system 914 can be maintained as a computer application with the computer-readable media 910 and executed on the processors 908. The device applications 912 can also include a device manager 916, a telephone control service 918, and a telephone test service 920. In this example, the device applications 912 are shown as software modules and/or computer applications that can implement various embodiments of telephone control service.

Device 900 can also include an audio, video, and/or image processing system 922 that provides audio data to an audio rendering system 924 and/or provides video or image data to a display system 926. The audio rendering system 924 and/or the display system 926 can include any devices or components that process, display, and/or otherwise render audio, video, and image data. The audio rendering system 924 and/or the display system 926 can be implemented as integrated components of the example device 900. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Although embodiments of a telephone control service have been described in language specific to features and/or methods, it is to be understood that the subject of the appended claims is not necessarily limited to the specific features or methods described. Rather, the specific features and methods are disclosed as example implementations of a telephone control service.

The invention claimed is:
1. A method, comprising:
receiving a request for a video clip from a mobile phone that is associated with a content distributor, the request received from the mobile phone as a telephone call that includes voice-prompted inputs that identify the video clip or as a text message that identifies the video clip;

obtaining the video clip;

determining that a communication link with the mobile phone is already established if the request is received from the mobile phone as the telephone call, and determining that the communication link with the mobile phone is not already established if the request is received from the mobile phone as a text message; and:

communicating the video clip to the mobile phone via the communication link to be rendered on the mobile phone responsive to determining that the communication link with the mobile phone is already established; and establishing an additional communication link with the mobile phone and communicating the video clip to the mobile phone via the additional communication link to be rendered on the mobile phone responsive to determining that the communication link with the mobile phone is not already established.

2. A method as recited in claim 1, further comprising:

receiving an additional request from the mobile phone to forward the video clip to an additional mobile phone; and communicating the video clip to the additional mobile phone via the wireless communications network to be rendered on the additional mobile phone.

3. A method, comprising:

receiving a request from a mobile phone to interface with a content distributor as a diagnostic aid, the request received from the mobile phone as a telephone call that includes voice-prompted inputs to interface with the content distributor or as a text message;

executing diagnostic instructions according to the request from the mobile phone to identify one or more system problems associated with the content distributor, the one or more system problems comprising one or more of poor signal quality, poor audio quality, or slow network traffic; and communicating the one or more system problems to the mobile phone via a wireless communications network to render the one or more system problems as a telephone communication of diagnostic feedback, the communicating comprising communicating the one or more system problems to the mobile phone via a communication link established with the mobile phone if the request is received as the telephone call, and establishing a new communication link and communicating the one or more system problems to the mobile phone via the new communication link if the request is received as the text message.

4. A method as recited in claim 3, wherein the diagnostic instructions are executed based on the request from the mobile phone to status components of the content distributor.

5. A method as recited in claim 3, wherein the diagnostic instructions are executed as one or more scripted diagnostic scenarios based on the request from the mobile phone.

6. A method as recited in claim 3, further comprising:

executing the diagnostic instructions according to the request from the mobile phone to determine test metrics associated with the content distributor; and communicating the test metrics to the mobile phone via the wireless communications network to render the test metrics as the diagnostic feedback.

7. A method as recited in claim 3, further comprising:

executing the diagnostic instructions according to the request from the mobile phone to determine content distribution statistics associated with the content distributor; and communicating the content distribution statistics to the mobile phone via the wireless communications network to render the content distribution statistics as the diagnostic feedback.

8. A mobile phone, comprising:

a memory and a processor system to implement a communication device manager configured to request a video clip from a content distributor, the communication device manager configured to request the video clip via a telephone call that includes voice-prompted inputs that identify the video clip, or via a text message that identifies the video clip; and a communication interface configured to:

receive the video clip from the content distributor via a communication link that is already established by the telephone call if the video clip is requested as the telephone call; and establish an additional communication link with the content distributor and receive the video clip from the content distributor via the additional communication link if the video clip is requested as the text message.

9. A mobile phone as recited in claim 8, wherein the communication device manager is further configured to receive a request to forward the video clip to an additional mobile phone, and wherein the communication interface is further configured to communicate the video clip to the additional mobile phone.

* * * * *